(12) United States Patent
Kootale

(10) Patent No.: US 6,988,104 B2
(45) Date of Patent: Jan. 17, 2006

(54) SYSTEM AND METHOD FOR ALLOCATING DATA IN A HIERARCHICAL ORGANIZATION OF DATA

(75) Inventor: Krishnadas C. Kootale, Mount Arlington, NJ (US)

(73) Assignee: i2 Technologies U.S., Inc., Dallas, TX (US)

( * ) Notice: Subject to any disclaimer, the term of this patent is extended or adjusted under 35 U.S.C. 154(b) by 443 days.

(21) Appl. No.: 09/825,083

(22) Filed: Apr. 2, 2001

(65) Prior Publication Data

US 2002/0178167 A1    Nov. 28, 2002

(51) Int. Cl.
G06F 7/06        (2006.01)

(52) U.S. Cl. ............ 707/100; 700/101; 700/102; 700/104.1

(58) Field of Classification Search ........ 707/100, 707/101, 102–104.1, 1–10, 200–206, 3; 705/10, 705/7

See application file for complete search history.

(56) References Cited

U.S. PATENT DOCUMENTS

| | | | |
|---|---|---|---|
| 5,285,392 A * | 2/1994 | Kyle et al. .................. 700/100 |
| 5,359,724 A | 10/1994 | Earle ........................... 395/425 |
| 5,406,477 A * | 4/1995 | Harhen .......................... 705/7 |
| 5,502,576 A | 3/1996 | Ramsay et al. ............. 358/444 |
| 5,758,026 A * | 5/1998 | Lobley et al. .................. 707/5 |
| 5,799,295 A | 8/1998 | Nagai ........................... 706/46 |
| 5,861,885 A | 1/1999 | Strasnick et al. ........... 345/355 |
| 5,936,860 A * | 8/1999 | Arnold et al. ................ 700/95 |
| 5,946,662 A * | 8/1999 | Ettl et al. ....................... 705/8 |
| 5,991,732 A * | 11/1999 | Moslares ........................ 705/8 |
| 5,991,754 A | 11/1999 | Raitto et al. ................... 707/2 |
| 6,034,697 A | 3/2000 | Becker ........................ 345/433 |
| 6,111,578 A | 8/2000 | Tesler .......................... 345/356 |
| 6,119,102 A * | 9/2000 | Rush et al. .................... 705/29 |
| 6,151,582 A * | 11/2000 | Huang et al. .................. 705/10 |
| 6,163,774 A | 12/2000 | Lore et al. ...................... 707/2 |
| 6,442,554 B1 * | 8/2002 | Reddy et al. ............... 707/100 |
| 6,574,619 B1 * | 6/2003 | Reddy et al. .................. 707/2 |

FOREIGN PATENT DOCUMENTS

EP        0742524 A2      11/1996

OTHER PUBLICATIONS

Alex Safavi; "Choosing the Right Forecasting System;" The Journal of Business Forecasting; pp. 8 & 10, Fall 2000.

Christian Gourieroux, et al.; "Themes in Modern Econometrics: Statistics and Econometric Models, vol. One;" Cambridge University Press; pp. 334-335, 1995.

(Continued)

*Primary Examiner*—Kim Vu
*Assistant Examiner*—Thomas Gyorfi
(74) *Attorney, Agent, or Firm*—James E. Walton; Brian E. Harris

(57) ABSTRACT

A method for allocating data in a hierarchical organization of data (16) includes determining new values for one or more parents (200, 220) in the organization of data (16) and determining current values for one or more children (210, 230) in the organization of data (16). Each child (210, 230) is hierarchically related to one or more of the parents (200, 220). The method also includes determining the relationship between each parent (200, 220) and its children (210, 230) and determining a variation for each child (210, 230). Furthermore, the method includes determining a new value for each child (210, 230) by allocating the new values of the parents (200, 220) to the children based on the parent-child relationships, the current values of the children (210, 230), and the variations of the children (210, 230).

34 Claims, 3 Drawing Sheets

OTHER PUBLICATIONS

William Greene; "Econometric Analysis;" Second Edition, Prentice Hall; pp. 204-205, 1993.

George G. Judge, et al.; "The Theory and Practice of Econometrics;" Second Edition, John Wiley and Sons; pp. 52-53, 1985.

International Search Report, Jun. 7, 2000.

Brown, Bulkley, "Database Marketing and Business Geographics," XP-002070806, Proceedings of the Annual SAS Users Group International Conference, SUGI, XX, XX, vol. 1, pp. 830-835, Jan. 1, 1996.

R.V. Mallya, "Adaptation of Bill of Materials for Custom Built Products," XP-000746860, Omega, GB, Pergamon Press, Oxford, vol. 9, No. 2, pp. 207-208, Jan. 1, 1981.

i2 Technologies, "Demand Planning Solutions," http://www.i2.com/html/i2_solutions_for_demand_planning.html, 3 pages Dec. 28, 1998.

U.S. Appl. No. 09/241,361, filed Jan. 29, 1999, entitled *"System and Method for Generating Dependent Data,"*, 43 pages, Jan. 29, 1999.

* cited by examiner

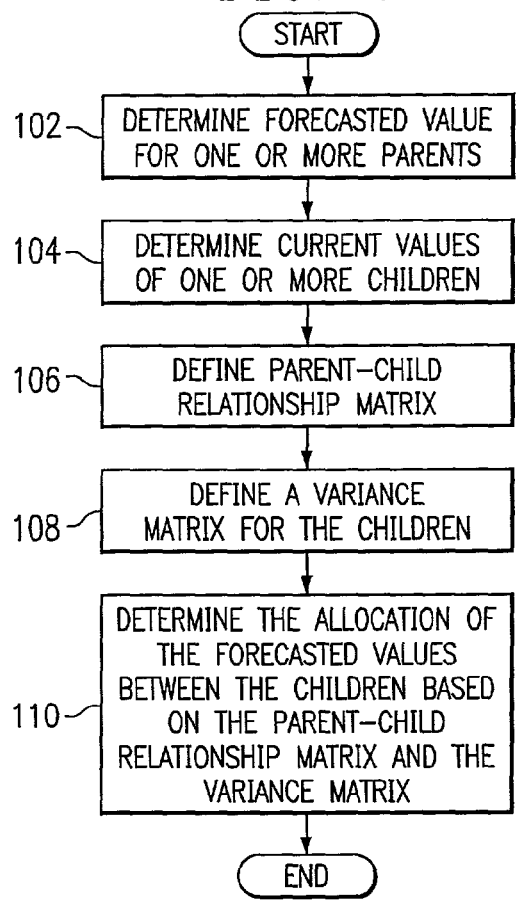
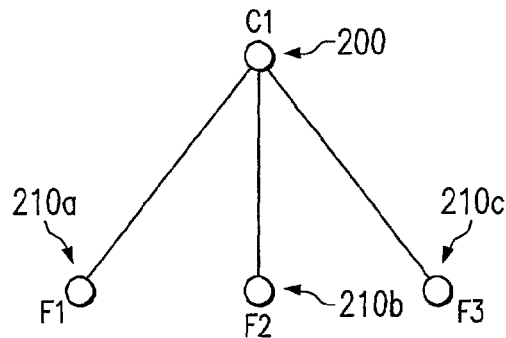
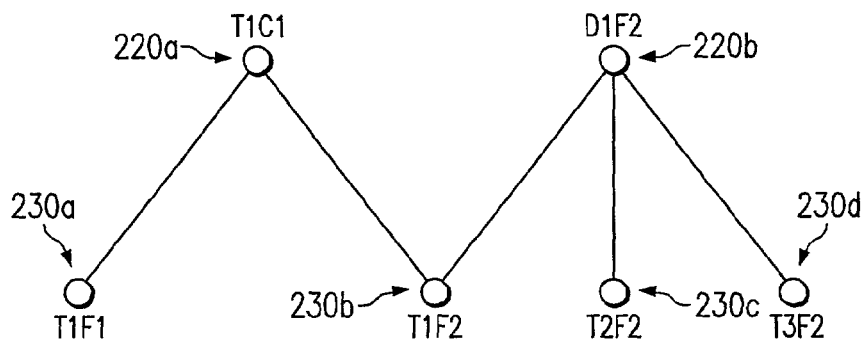

SYSTEM AND METHOD FOR ALLOCATING DATA IN A HIERARCHICAL ORGANIZATION OF DATA

TECHNICAL FIELD OF THE INVENTION

This invention relates to the field of data allocation, and more particularly to a system and method for allocating data in a hierarchical organization of data.

BACKGROUND OF THE INVENTION

It is often desirable within a business or other planning environment to generate information regarding demand, available supply, selling price, or other data concerning a product or other item. Data for products may often be dependent in some manner on data for other hierarchically related products. For example, demand for a product with multiple components may drive the demand for a particular one of those components. Similarly, demand for products in a particular geographic region may drive the demand for the products in a particular territory in the region. Because of these hierarchical dependencies, the data concerning various products or other items may be stored hierarchically in data storage or derived in a hierarchical fashion. Furthermore, the data may be stored at a storage location associated with multiple dimensions, such as a product dimension (the storage location being associated with a particular product or product component), a geography dimension (the storage location being associated with a particular geographical area), and a time dimension (the storage location being associated with a particular time or time period).

It is often desirable to update product data by forecasting demand values or other appropriate values for a particular product or group of products. As an example, using the current and/or past demand values associated with a particular product in a particular state, the demand for the product in that state at a time in the future may be forecasted. However, it may not be feasible or accurate to forecast demand values for the product in a particular region of the state or to forecast demand values for the product in the entire country in which the state is included. Instead, the demand value for the product in the particular state may be used to determine other hierarchically related demand values using allocation techniques. For example, the forecasted demand value may be allocated by aggregating it with demand values for the product in other states in the country to determine a demand value for the product in the entire country. Alternatively, the demand value may be allocated by disaggregating it to determine a demand value for the product in each of the regions of the state. However, many current allocation methods do not provide a sufficiently accurate allocation of forecasted values and thus negatively affect demand planning, supply planning, or other planning based on the allocated values.

SUMMARY OF THE INVENTION

According to the present invention, disadvantages and problems associated with previous data allocation techniques have been substantially reduced or eliminated.

According to one embodiment of the present invention, a method for allocating data in a hierarchical organization of data includes determining new values for one or more parents in the organization of data and determining current values for one or more children in the organization of data. Each child is hierarchically related to one or more of the parents. The method also includes determining the relationship between each parent and its children and determining a variation for each child. Furthermore, the method includes determining a new value for each child by allocating the new values of the parents to the children based on the parent-child relationships, the current values of the children, and the variations of the children.

The present invention provides a number of important technical advantages. Unlike previous data allocation techniques, embodiments of the present invention account for the variance of data values associated with a storage location in a hierarchical database or other organization of data when allocating a value to that storage location based on the forecasted value of a hierarchically related storage location. Therefore, the present invention provides a more accurate allocation than previous techniques. Furthermore, embodiments of the present invention also take into account multi-dimensional relationships between storage locations in a multi-dimensional hierarchical organization of data when allocating forecasted values. In addition, embodiments of the present invention typically do not require complex computations to perform such allocations. Other important technical advantages are readily apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 4 illustrates an exemplary method for allocating data within a business or other planning environment;

FIG. 5 illustrates an exemplary allocation of a forecasted value associated with a single parent in one dimension; and FIG. 6 illustrates an exemplary allocation of forecasted values associated with multiple parents associated with multiple dimensions.

DETAILED DESCRIPTION OF THE INVENTION

Figure 1:
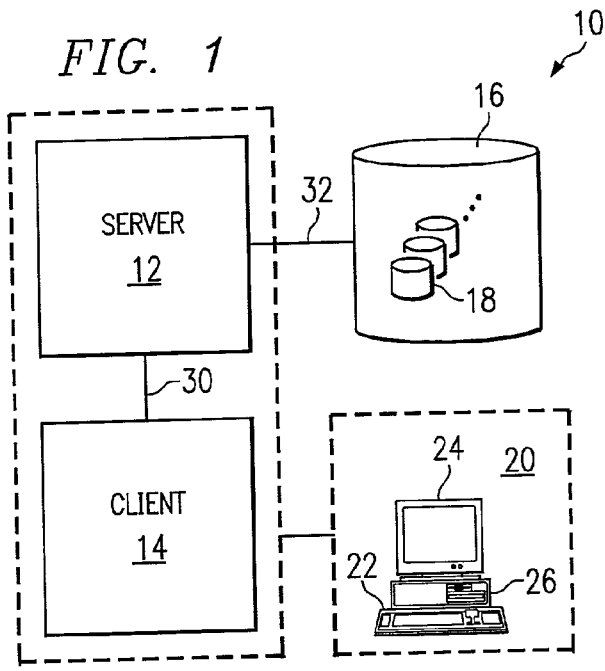
FIG. 1 illustrates an exemplary system for allocating data in a hierarchical organization of data.

FIG. 1 illustrates an exemplary system 10 for allocating data, such as forecasted data, in a hierarchical organization of data associated with a business or other planning environment. As described below, system 10 implements an allocation strategy that may be used to allocate a value associated with a particular data member in a data storage device or in a representation of data to hierarchically related data members. In general, forecasted data provides an estimate of the forecasted demand, available supply, selling price, or other quantifiable data measure associated with a particular product or other item. Although products are typically referred to throughout this application, the present invention contemplates system 10 allocating forecast data for appropriate tangible or non-tangible items other than products, including but not limited to services or other benefits. Furthermore, although forecasts are primarily discussed herein, the present invention is similarly applicable to allocating historical or other data, separately or in combination with forecast data, according to particular planning needs of an enterprise, facility, or user. Moreover, although the present invention is described primarily in connection with allocating demand forecasts for products, those skilled in the art will appreciate that the present invention is similarly applicable to allocating forecasts for available supply, selling price, and any other suitable data.

System 10 includes client 12, server 14, and data storage 16. Client 12 may include one or more processes to provide appropriate administration, analysis, and planning input. Although these processes are preferably separate processes running on a dedicated client processor, the present invention contemplates these processes being integrated, in whole or in part, and running on one or more processors within the same or different computers. Similarly, the server 14 may include one or more processes to receive administration, analysis, and planning input from client 12 and interact with data storage 16 to provide corresponding output to client 12. Although the processes are preferably separate processes running on a dedicated server processor, the present invention contemplates these processes being integrated, in whole or in part, and running on one or more processors within the same or different computers. Client 12 and server 14 may be fully autonomous or may operate at least in part subject to input from users of system 10.

The term "data storage" is used to refer to any appropriate data source, representation of data, or other organization of data. Data storage 16 may be hierarchical in nature, may be multi-dimensional, and/or may provide persistent data storage for system 10. For example, data storage 16 may be a multi-dimensional database that stores data in a hierarchical and multidimensional format or data storage 16 may be a representation of data derived by server 12 or other appropriate component from data stored in a relational database, in memory, or in any other appropriate location. Server 12 or other appropriate component may use a multi-dimensional hierarchical transformation layer to create such a representation of the data. In one embodiment, data storage 16 includes three-dimensional data and, for each data measure, associates with each storage location 18 a particular member from the product dimension, a particular member from the geography dimension, and a particular member from the time dimension. Each of these particular combinations of members of these three dimensions is associated with a corresponding storage location 18 in data storage 16, similar to each combination of coordinates from the x, y, and z axes being associated with a point in three-dimensional Euclidian space. Furthermore, position within a particular dimension may be changed independent of members of other dimensions, much like the position of a coordinate along the x axis may be changed independent of the positions of other coordinates along the y and z axes in three-dimensional Euclidian space.

The present invention contemplates data storage 16 having as few or as many dimensions as appropriate for the particular application. For example, and not by way of limitation, an enterprise associated with system 10 may not consider geography in connection with its data forecasting needs. This might be the case when products are ordered using the Internet or the telephone and then distributed from a single distribution point. In this example, data storage 16 might be two-dimensional rather than three-dimensional and might not reflect positions or members within the geography dimension. Furthermore, the demand or other data might be quantified per specified time interval, in which case data storage 16 might be two-dimensional and might not reflect positions or members within the time dimension. Other possible scenarios involving more or fewer than three dimensions will be apparent to those skilled in the art. The present invention contemplates data storage 16 having any number of dimensions appropriate for the needs of the enterprise or facility associated with system 10.

In the three-dimensional embodiment of the present invention, the values of the data measures within the set for a particular storage location 18 depend on the combined positions of members within product, geography, and time dimensions for that storage location 18. As a result, the values of the data measures typically vary with these combined positions as appropriate to accurately reflect the demand, available supply, selling price, or other data associated with these members. As described below, when a suitable combination of members is specified in the product, geography, and time dimensions according to operation of system 10, data storage 16 accesses the data measures for storage location 18 associated with that combination of members to assist system 10 in allocating demand forecasts or other suitable data. The present invention contemplates other suitable dimensions to replace or be combined with the product, geography, and time dimensions according to particular needs.

In one embodiment, data storage 16 supports multi-dimensional on-line analytical processing (OLAP) capability and is populated with data measures received from one or more transactional data sources that are internal, external, or both internal and external to the enterprise or facility associated with system 10. For example, and not by way of limitation, data measures received from sources internal to a manufacturing or warehousing facility may include unit shipping data, dollar shipping data, inventory data, pricing data, and any other suitable information applicable to demand forecasting. Data measures received from external sources, such as from syndicated partners of the enterprise or facility, may include point-of-sale demographic data and any other suitable information. The present invention contemplates appropriate data measures being stored in data storage 16 in any suitable manner.

Server 12 is coupled to data storage 16 using link 32, which may be any wireline, wireless, or other link suitable to support data communications between server 12 and data storage 16 during operation of system 10. Data storage 16 may be integral to or separate from server 12, may operate on one or more computers, and may store any information suitable to support the operation of system 10 in allocating demand forecasts or other data. Server 12 is coupled to client 14 using link 30, which may be any wireline, wireless, or other link suitable to support communications between server 12, client 14, and the processes of server 12 and client 14 during operation of system 10. Although link 30 is shown as generally coupling server 12 to client 14, processes of server 12 may communicate directly with one or more corresponding processes of client 14.

System 10 may operate on one or more computers 20 that are integral to or separate from the hardware and software that support server 12, client 14, and data storage 16. Computer 20 may include a suitable input device 22, such as a keypad, mouse, touch screen, microphone, or other device to input information. An output device 24 may convey information associated with the operation of system 10, including digital or analog data, visual information, or audio information. Computer 20 may include fixed or removable storage media, such as magnetic computer disks, CD-ROM, or other suitable media to receive output from and provide input to system 10. Computer 30 may include one or more processors 26 and associated memory to execute instructions and manipulate information according to the operation of system 10. Although only a single computer 20 is shown, server 12, client 14, and data storage 16 may each operate on separate computers 20 or may operate on one or more shared computers 20 without departing from the intended scope of the present invention. Each of the one or more computers 20 may be a work station, personal computer (PC), network computer, personal digital assistant (PDA), wireless data port, or any other suitable computing device.

Figure 2:
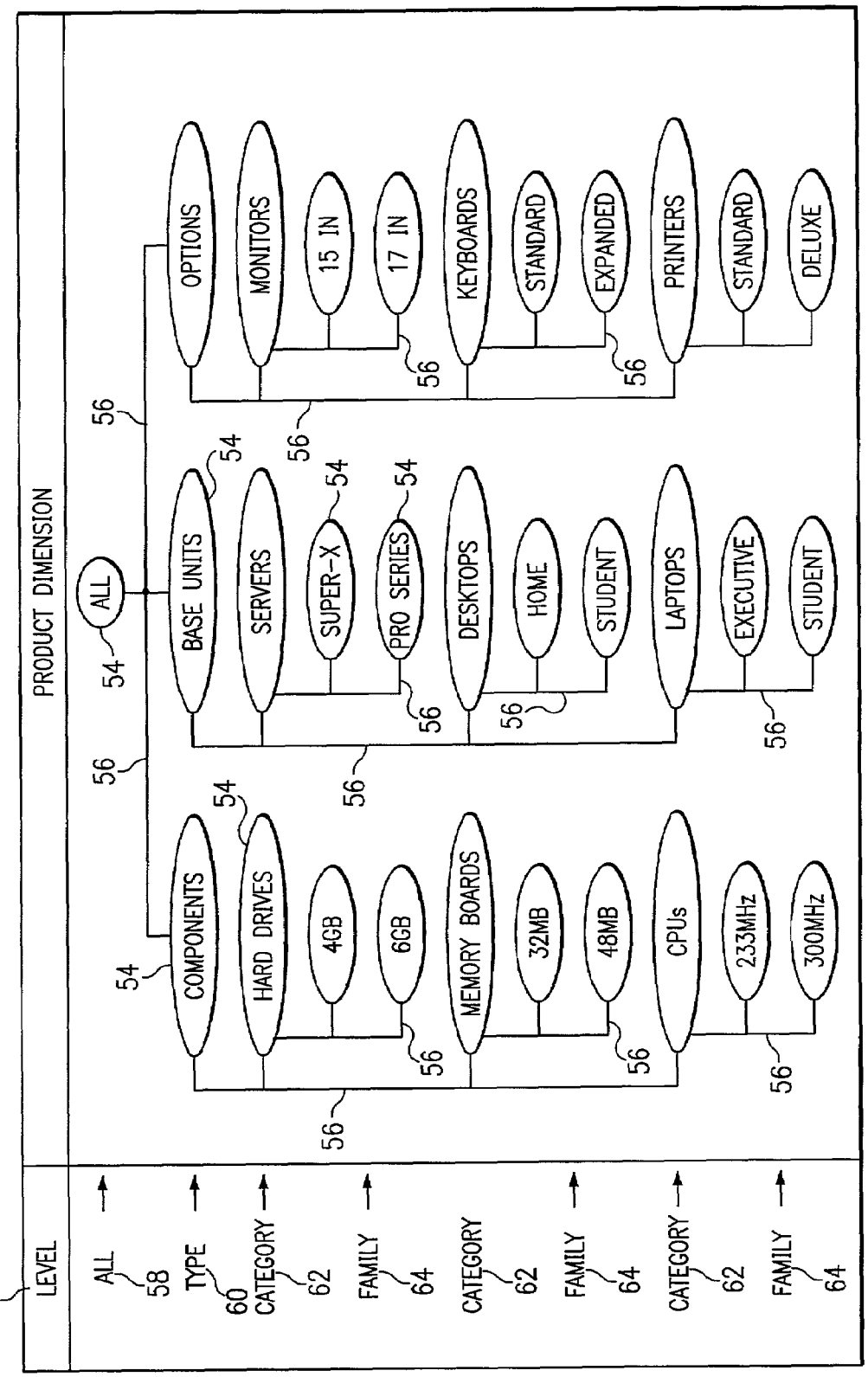
FIG. 2 illustrates an exemplary product dimension within a multi-dimensional organization of data.

FIG. 2 illustrates an exemplary product dimension 50 within data storage 16 that includes a hierarchy of product levels 52 each having one or more members 54. The value of each data measure associated with a member 54 is an aggregation of the values of corresponding data measures associated with hierarchically related members 54 in lower levels 52 of product dimension 50. In an exemplary embodiment in which system 10 provides demand forecasts, the demand associated with a member 54 is the aggregate demand for these hierarchically related members 54 in lower levels 52 of product dimension 50. In the illustrated embodiment, product levels 52 for product dimension 50 include an all products level 58, a product type level 60, a product category level 62, and a product family level 64. Selected and merely exemplary hierarchical relationships between members 54 are shown using links 56, as described more fully below. Links 56 between hierarchically related members 54 in adjacent levels 52 of product dimension 50 reflect parent-child relationships between members 54. Although FIG. 2 is described primarily in connection with demand relationships, the following description is similarly applicable to other data relationships, such as available supply, selling price, or any other relationships relating to data measures associated with an item or set of items.

In the particular example shown in FIG. 2, all products level 58 contains "All" member 54 representing the aggregate demand for all members 54 in lower levels 60, 62, and 64 of product dimension 50. Product type level 60 contains "Components," "Base Units," and "Options" members 54. "Components" member 54 represents the aggregate demand for hierarchically related members 54 below "Components" member 54 in levels 62 and 64 of product dimension 50. Similarly, "Base Units" member 54 represents the aggregate demand for hierarchically related members 54 below "Base Units" member 54 and "Options" member 54 represents the aggregate demand for hierarchically related members 54 below "Options" member 54. Links 56 between "All" member 54 and "Components," "Base Units," and "Options" members 54 indicate the hierarchical relationships between these members 54.

Product category level 62 contains, under "Components" member 54, "Hard Drives," "Memory Boards," and "CPUs" members 54. "Hard Drives" member 54 represents the aggregate demand for hierarchically related members 54 below "Hard Drives" member 54 in level 64 of product dimension 50. Similarly, "Memory Boards" member 54 represents aggregate demand for hierarchically related members 54 below "Memory Boards" member 54 and "CPUs" member 54 represents the aggregate demand for hierarchically related members 54 below "CPUs" member 54. Links 56 between "Components" member 54 and "Hard Drives," "Memory Boards," and "CPUs" members 54 indicate the hierarchical relationships between these members 54. Analogous links 56 reflect hierarchical relationships between "Base Units" and "Options" members 54 of product type level 60 and corresponding members 54 in lower levels 62 and 64 within product dimension 50.

Product family level 64 contains, under "Hard Drives" member 54, "4 GB" and "6 GB" members 54. Links 56 between "Hard Drives" member 54 and "4 GB" and "6 GB" members 54 indicate hierarchical relationships between these members 54. Analogous links 56 reflect hierarchical relationships between "Memory Boards," "CPUs," "Servers," "Desktops," "Laptops," "Monitors," "Keyboards," and "Printers" members 54 of product category level 62 and corresponding members 54 in lower level 64 within product dimension 50. Although no links 56 are shown between members 54 in product family level 64 and possible lower levels 52, the present invention contemplates such further levels 52 existing within product dimension 50 and analogous links 56 to reflect the corresponding hierarchical relationships. Furthermore, members 54 shown in FIG. 2 are exemplary only and are not intended to be an exhaustive set of all possible members 54. Those skilled in the art will appreciate that other suitable members 54 and associated links 56 may exist without departing from the intended scope of the present invention.

Figure 3:
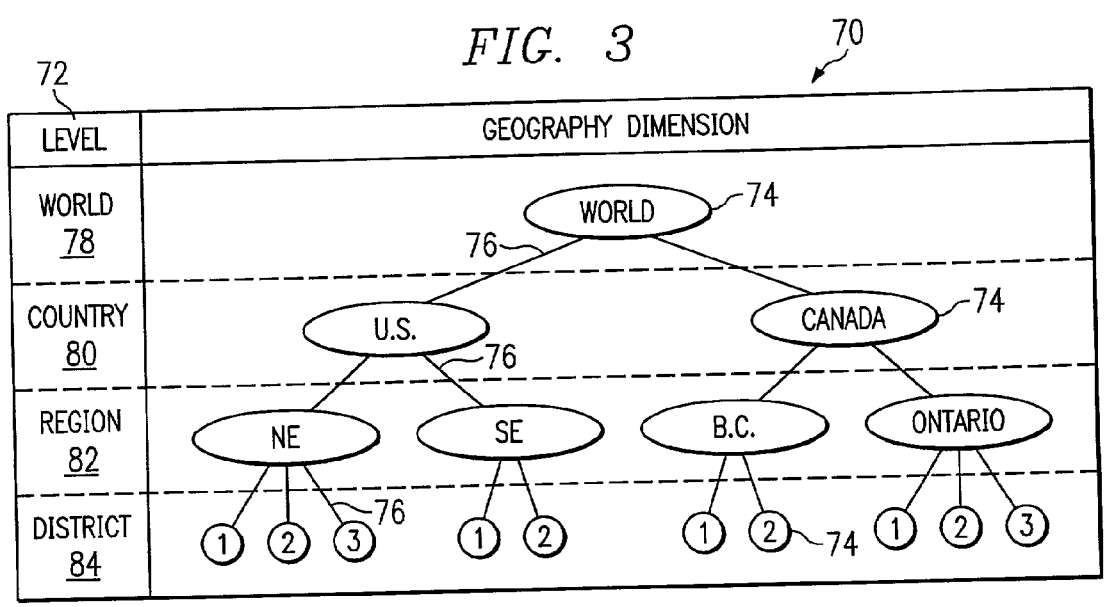
FIG. 3 illustrates an exemplary geography dimension within a multi-dimensional organization of data.

FIG. 3 illustrates an exemplary geography dimension 70 within data storage 16 that includes a hierarchy of geography levels 72 each having one or more members 74. The value of each data measure associated with a member 74 is an aggregation of the values of corresponding data measures associated with hierarchically related members 74 in lower levels 72 of geography dimension 70. In the exemplary embodiment in which system 10 provides demand forecasts, the demand associated with a member 74 is the aggregate demand for these hierarchically related members 74. In this embodiment, geography levels 72 for geography dimension 70 include a world level 78, a country level 80, a region level 82, and a district level 84. Selected and merely exemplary hierarchical relationships between members 74 are shown using links 76, which are analogous to links 56 described above with reference to FIG. 2. Although FIG. 3 is described primarily in connection with demand relationships, the following description is similarly applicable to other data relationships, such as available supply, selling price, or any other relationships relating to one or more data measures associated with an item or set of items.

In the particular example illustrated in FIG. 3, world level 78 contains "World" member 74 representing aggregate worldwide demand. Country level 80 contains "U.S." and "Canada" members 74, which represent aggregate demand for the United States and Canada, respectively. Link 76 between "U.S." members 74 in country level 80 and "World" members 74 in world level 78 indicates a hierarchical relationship between these members 74. Similarly, link 76 between "Canada" member 74 and "World" member 74 indicates a hierarchical relationship between these members 74. In this example, worldwide demand is an aggregation of aggregate demand in the United States as well as aggregate demand in Canada. Although other links 76 are not described in detail, those skilled in the art will appreciate that links 76 are analogous to links 56 described above with reference to FIG. 2 in that each represents a corresponding hierarchical relationship between members 74 in the various levels 72 of geography dimension 70. As discussed above, the present invention contemplates eliminating or otherwise not considering the geography dimension 70 in allocating data, for example, if geography dimension 70 is not relevant to particular data forecasting needs. Data storage 16 might in this situation be two-dimensional.

Demand or other forecasts may be derived using traditional forecasting techniques and suitable information concerning products, geographic areas, customers, and/or other data dimension. Such information may include historical sales, causal factors, key account input, market intelligence, and the like. Forecasting techniques may rely on hierarchical relationships between members 54, 74 to allocate data forecasts for products corresponding to members 54, 74. As described above, the data measures associated with each member 54, 74 are an aggregation of the data measures associated with some or all members 54, 74 in lower levels 52, 72 within the same hierarchy of parent-child links 56, 76. Therefore, given forecast data for a member 54, 74 (a parent) at one level 52, 72, the forecasts for each of the related members 54 in the next lowest level 52, 72 (the children of the parent) may be determined by disaggregating the forecast data for the parent between the children. Furthermore, although the terms "parent" and "children" are used above to identify a relationship between members 54, 74 of a single dimension 50, 70, these terms may also be used to refer to the relationship between data measures or values associated with a storage location 18 associated with a member from each of a number of dimensions. For example, a storage location 18 that includes a demand value for a particular product in a particular state may be hierarchically related to a storage location 18 that includes a demand value for the product in a city of that state (the value associated with the former storage location 18 being a parent of the value associated with the latter storage location 18).

When allocating a forecast from one or more parents to their children, a "top-down" proportional allocation strategy is often used. In this strategy, the value of the forecast (such as a demand forecast) associated with a parent is divided proportionally among its children according to the relative current values (such as current demand values) associated with the children. Therefore, using such proportional allocation, children having larger values get a larger share of the number being allocated and children having smaller values get a proportionately smaller share. For example, if a parent with a forecasted demand of 1800 units has a first child that currently has an associated demand of 1000 units and a second child that currently has an associated demand of 500 units, then 1200 units of the forecasted demand would be allocated to the first child and 600 units of the forecasted demand would be allocated to the second child.

Top-down allocation, proportional or otherwise, may be used for many reasons. For example, forecasts that are estimated at a higher level 52, 72 often are more accurate and a forecast planner may want to keep those values intact and adjust the forecasts at the lower levels 52, 72 to agree with the higher level forecast. Alternatively, the forecasts at a high level 52, 72 may be specified, such as objectives and targets, and the lower level forecasts are adjusted to achieve the target forecast at the higher level 52, 72. However, proportional allocation is often too restrictive and may adversely affect the accuracy of the forecast values determined for children in the lower level 52, 72. For example, a scenario where proportional allocation may create inaccurate forecasts is when the value associated with a child to which an estimated forecast is to be allocated has a relatively high variance (for example, the value varies widely over time). In this case, a proportional allocation based on the current value associated with the child (or based on an average of a selected number of past values) may be skewed by a temporary fluctuation in the value.

Embodiments of the present invention provide an allocation strategy that accounts for variance in the values associated with children when allocating a forecasted value from a parent of the children. Furthermore, it is possible for the values of the children to have positive or negative relationships between themselves, so that a higher value associated with one child may have a correspondence with a higher or lower value associated with another child. The allocation strategy of the present invention may also account for these relations.

A distance measure may be defined as follows in order to take into account the variance and correspondence between children when allocating a forecast:

$$d=(\bar{x}-\bar{x}')\Sigma^{-1}(\bar{x}-\bar{x}') \quad (1)$$

In this equation, $\bar{x}$ is the vector of current values (such as demand values) associated with the children of a particular parent. $\Sigma$ is the variation matrix that identifies the variation of each child ($\Sigma^{-1}$ being the inverse of the variance matrix). The variation of a particular child may be expressed as a standard deviation, variance, or any other suitable measure and may be determined using statistical equations, models, or any other appropriate technique. $\bar{x}'$ is the vector of the values associated with the children after the allocation of the forecast from the parent. To optimally allocate the forecast, the selection of the values of $\bar{x}'$ should minimize the distance d.

According to the present invention, the determination of $\bar{x}'$ may be subject to the constraint of the parent-child relationships. For general linear relationships, such as when the value associated with a parent equals the sum or average of the values associated with its children, it is possible to define a suitable parent-child relationship matrix R such that if $\bar{y}$ is the vector of values associated with one or more parents of the children represented in $\bar{x}$ and $\bar{x}'$, then the parent-child relationship can be expressed as follows:

$$R\bar{x}'=\bar{y} \quad (2)$$

It should be noted that a child may have multiple parents in the same dimension or in multiple dimensions. This concept is described below with reference to FIG. 6. Given the above two equations, an optimal $\bar{x}'$ may be given by the following equation:

$$\bar{x}'=\bar{x}+\Sigma R^T(R\Sigma R^T)^{-1}(\bar{y}-R\bar{x}) \quad (3)$$

where $R^T$ is the transpose of R.

As an example only and not by way of limitation, consider a local hierarchy with one parent and three children for a time series of length T. The values of each child i may be denoted by a separate column vector $(x_{i,1}, \ldots, x_{i,T})$ and the values of the parent may be denoted by a single column vector $(y_1, y_2, \ldots, y_T)$. A single column vector including the values of all children i for all times t may be expressed as follows:

$$\bar{x} = \begin{bmatrix} x_{1,1} \\ x_{2,1} \\ x_{3,1} \\ x_{1,2} \\ x_{2,2} \\ x_{3,2} \\ \vdots \\ x_{1,T} \\ x_{2,T} \\ x_{3,T} \end{bmatrix}$$

Assuming that an exemplary parent-child relationship indicates that, at each time, the sum of values of all the children should equal the value of the parent, the parent-child relationship matrix may be expressed as follows:

$$R = \begin{bmatrix} 1 & 1 & 1 & 0 & 0 & 0 & \cdots & 0 & 0 & 0 \\ 0 & 0 & 0 & 1 & 1 & 1 & \cdots & 0 & 0 & 0 \\ 0 & 0 & 0 & 0 & 0 & 0 & \cdots & 0 & 0 & 0 \\ & & & & & & \ddots & & & \\ 0 & 0 & 0 & 0 & 0 & 0 & \cdots & 0 & 0 & 0 \\ 0 & 0 & 0 & 0 & 0 & 0 & \cdots & 1 & 1 & 1 \end{bmatrix}$$

In general, the matrix Variation(x) representing the variations of all children at all times is a square matrix of dimension equal to the product of the number of children and T. In such a matrix, most elements are equal to zero. For example, assume that the values of $\bar{x}$ are predictions from a model. Variation(x) assumes a typical block-diagonal structure as follows:

$$Variation(x) = \begin{bmatrix} \Sigma^1 & 0 & \cdots & 0 \\ 0 & \Sigma^2 & \cdots & 0 \\ & & \cdots & \\ 0 & 0 & \cdots & \Sigma^T \end{bmatrix}$$

where, the zeros represent variation matrices of all elements zero of appropriate order and each $\Sigma^t$ (not italicized in the above matrix) is of the general form (for the example case of three children):

$$\Sigma^t = \begin{bmatrix} \sigma^t_{1,1} & \sigma^t_{1,2} & \sigma^t_{1,3} \\ \sigma^t_{2,1} & \sigma^t_{2,2} & \sigma^t_{2,3} \\ \sigma^t_{3,1} & \sigma^t_{3,2} & \sigma^t_{3,3} \end{bmatrix}$$

where $\sigma_{1,1}{}^t$ is the variation (such as the variation) of a particular child i at time t and $\sigma_{i,j}{}^t$ is the correlated variation or "covariation" (such as the covariance) between two different children i and j at time t. The variations and covariations may be determined using any appropriate methods, including but not limited to standard statistical formulas or more complex statistical models. In certain embodiments, the covariations are not utilized and are replaced by zeros in the above matrix.

After algebraic manipulation of the expression for $\bar{x}'$ described above, the allocation to each child i for a particular time t amounts to adding to its value $\bar{x}$ at time t a proportion, $$\frac{\sum_j \sigma^t_{i,j}}{\sum_{i,j} \sigma^t_{i,j}},$$

of the difference at the time t between the value associated with the parent and the sum of the values associated with children. Under the most common scenario of univariate modeling and forecasting methods, the adjustment proportion would take the simpler form, $$\frac{\sigma^t_{i,i}}{\sum_i \sigma^t_{i,i}}.$$

Unlike previous allocation techniques, embodiments of the present invention account for the variation of the data values associated with a child in a hierarchical organization of data when allocating a value to that child from a parent. Therefore, the present invention provides a more accurate allocation. Furthermore, embodiments of the present invention may also take into account parent-child relationships involving different dimensions of data storage 16 when allocating a value. In addition, embodiments of the present invention typically do not require complex computations to perform an allocation. Exemplary allocation scenarios are described below with reference to FIGS. 5 and 6.

FIG. 4 illustrates an exemplary method for allocating data, such as forecast data, in hierarchical organization of data associated with a business or other planning environment. The method begins at step 102 where the value of one or more parents at a time t is forecasted or otherwise determined. As described above, any appropriate technique for generating a forecast for a particular value (such as a demand value) associated with a parent may be used. Values associated with multiple parents in different dimensions within data storage 16 may be determined and those values may be allocated to the children of those parents according to the present method. If there is a single parent value, then this value is represented in Equations (1), (2), and (3) above as a value y (instead of a vector $\bar{y}$). If there are multiple parent values, those parent values are represented in the equations as a column vector $\bar{y}$. At step 104, the current values of the children (or the values otherwise existing before allocation of the forecasted parent value) are determined. These values are represented in Equations (1), (2), and (3) as the column vector $\bar{x}$.

At step 106, the parent-child relationship matrix R is determined. As described above, the parent-child relationship matrix is formulated such that the value of a parent or parents at a particular time is equal to the product of the parent-child relationship matrix and the vector of the child values at that time. The variation matrix $\Sigma$ for the children at the relevant time t is determined at step 108. As described above, the variations included in the variation matrix may be determined using any appropriate methods. At step 110, the values of the children at time t are determined according to Equation (3) presented above. In this equation, the values of the children at time t are represented as the vector $\bar{x}'$ and are determined using the values of $\bar{y}$, $\bar{x}$, R, and $\Sigma$ that were determined in steps 102, 104, 106, and 108, respectively. However, it should be understood that these values may be determined in any appropriate order and in any appropriate manner.

FIG. 5 illustrates an exemplary allocation of a forecasted value associated with a single parent 200 in one dimension using the method of FIG. 4. In this example, the current value (such as a demand value) associated with parent 200, which may represent a product category C1 in product dimension 50, is 600 units. Parent 200 has a first child 210a representing a product family F1 and having a current associated value of 100 units, a second child 210b representing a product family F2 and having a current associated value of 200 units, and a third child 210c representing a product family F3 and having a current associated value of 300 units. These values may be expressed in a vector as follows:

$$\overline{x} = \begin{bmatrix} 100 \\ 200 \\ 300 \end{bmatrix}$$

In this example, the sum of the values of children 210 equals the value of parent 200. Therefore, the parent-child relationship matrix may be expressed as follows:

R=[1 1 1]

Furthermore, assume that the variation matrix for children 210 is as follows:

$$\sum = \begin{bmatrix} 5 & 0 & 0 \\ 0 & 25 & 0 \\ 0 & 0 & 10 \end{bmatrix}$$

Assuming that the forecasted value y associated with parent 200 at time t is 700 units, the values allocated to children 210 for time t using Equation (3) above may be determined as follows:

$$\overline{x}' = \overline{x} + \Sigma R^T (R\Sigma R^T)^{-1}(y - R\overline{x})$$

$$\overline{x}' = \begin{bmatrix} 100 \\ 200 \\ 300 \end{bmatrix} + \begin{bmatrix} 5 \\ 25 \\ 10 \end{bmatrix}(0.025)\left(700 - \begin{bmatrix} 1 & 1 & 1 \end{bmatrix}\begin{bmatrix} 100 \\ 200 \\ 300 \end{bmatrix}\right)$$

$$\overline{x}' = \begin{bmatrix} 112.5 \\ 262.5 \\ 325 \end{bmatrix}$$

It should be noted that the sum of these allocated values equals the forecasted parent value. Furthermore, these values may be compared to the values obtained using a proportional allocation technique. Using such a technique, the values of the first, second, and third children 210 would be 116.67 units, 233.33 units, and 350 units, respectfully. However, these values do not account for the variations in the values associated with each child 210 and thus likely to be less accurate than the values that are obtained above using the exemplary method of the present invention.

FIG. 6 illustrates an exemplary allocation of forecasted values associated with multiple parents 220 in multiple dimensions using the method of FIG. 4. In this example, a first parent 220a is associated with a territory T1 in geography dimension 70 and also with a product category C1 in product dimension 50. The product category C1 includes two families F1 and F2. Furthermore, a second parent 220b is associated with a district D1 in geography dimension 70 and also with family F2 in product dimension 50. District D1 includes territories T1, T2, and T3. As can be seen, the first and second parents 220 each represent values (such as demand values) associated with two dimensions. Parent 220a represents values associated with product category C1 in territory T1. Parent 220b represents values associated with district D1 for product family F2.

Parent 220a has a first child 230a that represents values associated with product family F1 in territory T1 and has a second child 230b that represents values associated with product family F2 in territory T1. Parent 220b has a first child 230b that represents values associated with product family F2 in territory T1, a second child 230c that represents values associated with product family F2 in territory T2, and a third child 230d that represents values associated with product family F2 in territory T3. Therefore, parents 220 share a single child 230b representing values associated with product family F2 in territory T1.

In this example, the current value (such as a demand value) associated with parent 220a is 300 units. Child 230a has an associated current value of 100 units and child 230b has an associated current value of 200 units. The current value associated with parent 220b is 900 units. As described above, child 230b (which is shared with parent 220a) has an associated current value of 200 units. Child 230c has an associated current value of 300 units and a child 230d has an associated current value of 400 units. The values associated with children 230 may be expressed in a vector as follows:

$$\overline{x} = \begin{bmatrix} 100 \\ 200 \\ 300 \\ 400 \end{bmatrix}$$

In this example, the sum of the values of children 230 equals the value of their respective parents 220. Therefore, the parent-child relationship matrix may be expressed as follows:

$$R = \begin{bmatrix} 1 & 1 & 0 & 0 \\ 0 & 1 & 1 & 1 \end{bmatrix}$$

Furthermore, assume that the variance matrix for children 230 is as follows:

$$\sum = \begin{bmatrix} 10 & 0 & 0 & 0 \\ 0 & 20 & 0 & 0 \\ 0 & 0 & 30 & 0 \\ 0 & 0 & 0 & 40 \end{bmatrix}$$

Assuming that the forecasted value associated with parent 220a at time t is 400 units and the forecasted value associated with parent 220b at time t is 1000 units, the values allocated to children 230 at time t using Equation (3) above may be determined as follows:

$$\overline{x}' = \overline{x} + \Sigma R^T (R\Sigma R^T)^{-1}(\overline{y} - R\overline{x})$$

$$\bar{x}' = \begin{bmatrix} 100 \\ 200 \\ 300 \\ 400 \end{bmatrix} + \begin{bmatrix} 10 & 0 \\ 20 & 20 \\ 0 & 30 \\ 0 & 40 \end{bmatrix} \begin{bmatrix} 0.039 & -0.008 \\ -0.009 & 0.013 \end{bmatrix} \left( \begin{bmatrix} 400 \\ 1000 \end{bmatrix} - \begin{bmatrix} 1 & 1 & 0 & 0 \\ 0 & 1 & 1 & 1 \end{bmatrix} \begin{bmatrix} 100 \\ 200 \\ 300 \\ 400 \end{bmatrix} \right)$$

$$\bar{x}' = \begin{bmatrix} 130.43 \\ 269.57 \\ 313.04 \\ 417.39 \end{bmatrix}$$

It should be noted that the sum of the allocated values for children 230 equal the forecasted values of their respective parents 220. Furthermore, these values may be compared to the values obtained using a proportional allocation technique. Using such a technique, the values of children 230*a* and 230*b* of parent 220*a* would be 133.33 units and 266.67 units, respectively. The values of the children 230*b*, 230*c*, and 230*d* of parent 220*b* would be 222.22 units, 333.33 units, and 444.44 units, respectively. However, these values do not account for the variations in the values associated with each child 230 and thus likely to be less accurate than the values that are obtained above using the exemplary method of the present invention. Furthermore, the proportional allocation technique produces two different values for child 230*b* since the proportional allocation method is performed separately for each parent 220 and the allocation from each parent 220 produces a different result for the value to be associated with child 230*b*. These different results could then have to be reconciled. Therefore, the present invention is also advantageous in that it can simultaneously allocate values from multiple parents 220 to their children 230 (some of which may be common to two or more parents).

As can be seen from the above examples, the present invention provides for the allocation of data from parents to children in a hierarchical organization of data having one or more dimensions in a manner likely to be more accurate than with previous techniques. The present invention provides a number of advantages. For example, the representation of parent child relations using the parent-child relationship matrix R is a flexible and general mathematical representation allowing greater flexibility and rigor in allocation from parents to children. Furthermore, when the quantities involved in an allocation are appropriate statistical quantities, the result from the allocation is statistically optimal.

Although particular examples are described above, the techniques of the present invention may be used for many other applications. For example, one advantage of the present application is the generality offered by the parent-child relationship matrix in handling and representing parent-child relations. The parent-child relationship matrix can have as many rows as there are parents whose values need to be allocated to their children. However, if multiple parents do not have common children, computation may be simplified by separating such rows into different parent-child relationship matrices.

The most elementary case is a parent-child relationship matrix having a single row. The columns of the matrix represent the total number of children involved in a parent child relationship with a parent represented by the row of the matrix. Each child typically has only one column regardless of the number of parents the child has. The value of an element in a row will typically be zero if the corresponding column is not a child of the parent represented by the row. A nonzero value indicates that the corresponding column is a child of the parent represented by the row. The nonzero value itself could be any number, so that any linear relationship could exist between a set of children and their parent.

One example of a type of parent-child relationship is when the parent is equal to the sum of its children (an aggregation relation), as described above. In this case, each element of a row in the parent-child relationship matrix is zero if a child is not involved in the aggregation relation and is a one when the child is involved in the aggregation. Another type of parent-child relationship is when the parent is the average of its children. In this case, each element of a row of the parent-child relationship matrix is zero when the corresponding child is not involved in averaging and is the fraction $1/n$ (where n is equal to the number of children of the parent) when the corresponding child is involved in the averaging. Yet another example of a parent-child relationship is when the parent is a dollar value of a group of items and the children are quantities of each item contributing to the dollar value of the parent. In this case, each element of a row of the parent-child relationship matrix is zero when the corresponding child is not involved in contributing to the dollar value represented by the parent. The value of the element is equal to the price of the corresponding child when the child is involved in contributing to the dollar value represented by the parent.

It should be noted that a row of the parent-child relationship matrix may represent a direct parent of the children involved in an allocation or an indirect parent. For example, the parent represented by a row may be a parent of another member that is a parent of the children involved in the allocation. Furthermore, although the values in the parent-child relationship matrices described above are numerical, the values may also be semantic or have particular business meanings.

The flexibility offered by the parent-child relationship matrix is not restricted to cases where some or all of the values to be allocated are statistical quantities. For example, $\bar{x}$ may be zero or may be the result of other types of computations or user inputs. Similarly, $\Sigma$ also may include either statistical quantities, more simplified user-inputs, results of other non-statistical computations, or any other appropriate values. For certain cases, $\Sigma$ may include the same values as $\bar{x}$, or be directly related to those values, along its diagonal and have off-diagonal elements equal to zero.

For example, $\bar{x}$ may be regarded as zero and $\Sigma$ may be populated with values along its diagonal which are not all zero. In this case, the present invention could be used to perform a proportional allocation of the desired values of the parents to the children, taking advantage of the ability of the method to handle multiple parents with shared children. A similar example is when it is desirable to allocate the difference between the current value of a parent and the desired value, according to a particular proportion among its children. In this case, not all elements of $\bar{x}$ may be regarded as zero. The current values of $\bar{x}$ (or their functions, such as their square root or square) may be used as weights for an allocation and appear as the diagonal elements of $\Sigma$. Again, the advantage is the ability to allocate multiple parents to their children in a consistent fashion.

The above examples show that the parent-child relationship matrix and a variety of choices for $\bar{x}$ and $\Sigma$ allow for a flexible and generalized allocation scheme with respect to parent-child relations. Additional flexibility and rigor is obtained in the allocation by using a variety of different types of values as the contents of $\Sigma$. As a example only, one can design a $\Sigma$ matrix with the variances or a measure of the relative variation of the children along its diagonal. Further, unlike in the previous examples, the off-diagonal values of $\Sigma$ can be non-zero and made equal to measures of covariances or relative co-variation of each pair of children. This structure of $\Sigma$, when used in an allocation scheme, can account for relations between the children themselves. For example, when the value of one child i is higher, another child j may tend to be higher or lower to a degree specified by the quantity in the ith row and jth column of $\Sigma$.

Furthermore, the final allocated quantity may not be one that is explicitly produced by using Equation (3) presented above. For example, determining the final allocated quantity may involve selecting between and/or combining outputs obtained from different allocations using Equation (3). One reason for such selection and/or combination is that there may be uncertainties about the accuracy of the various quantities involved in allocation. In such cases, it may be preferable to use alternative quantities in the allocation method and combine the results of the allocations in an appropriate manner (for example, by averaging the results) such that the final quantities after allocation might not be the result of applying the method to any one choice of input quantities. Similarly the output from one or more of the allocations may be selected based on appropriate criteria.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method for allocating data in a hierarchical organization of data, comprising:
    determining new values for one or more parents in the organization of data;
    determining current values for one or more children in the organization of data, each child being hierarchically related to one or more of the parents;
    determining the relationship between each parent and its children;
    determining a variation for each child; and
    determining a new value for each child by allocating the new values of the parents to the children based on the parent-child relationships, the current values of the children, and either the sum of the variations of the children or a matrix of the variations of the children.

2. The method of claim 1, wherein the new values of the parents represent demand forecasts to be allocated to the children.

3. The method of claim 1, wherein the variation of each child is calculated using statistical techniques based on the historical variation in the values of the child over a specified time period.

4. The method of claim 1, wherein the new value of each child is determined using the equation:

$$\bar{x}' = \bar{x} + \Sigma R^T (R \Sigma R^T)^{-1} (\bar{y} - R\bar{x}),$$

in which $\bar{x}'$ comprises a vector of the new values of the children, $\bar{x}$ comprises a vector of the current values of the children, $\Sigma$ comprises a matrix of the variations of the children, R comprises a matrix identifying the parent-child relationships, $R^T$ comprises the transpose of R, and $\bar{y}$ comprises a vector of the new values of the parents.

5. The method of claim 1, wherein the new value of each child is determined using the equation:

$$\bar{x}'_i = \bar{x}_i + \frac{\sigma_{i,i}}{\sum_i \sigma_{i,i}} \left( \bar{y} - \sum_i \bar{x}_i \right),$$

in which $\bar{x}'_i$ comprises the new value of the child i, $\bar{x}_i$ comprises the current value associated with a child i, $\sigma_{i,i}$ comprises the variation of the child i, $\Sigma_i \sigma_{i,i}$ comprises the sum of the variations of the children, $\Sigma_i \bar{x}_i$ comprises the sum of the current values of the children, and $\bar{y}$ comprises the new value of the parent of the child i.

6. The method of claim 1, wherein:
    the organization of data comprises one or more dimensions; and
    the parents and children are all members of the same dimension within the organization of data.

7. The method of claim 1, wherein:
    the organization of data comprises multiple dimensions; and
    the parents and children are each associated with multiple dimensions of the organization of data.

8. The method of claim 7, wherein the parents and children each represent a storage location within the organization of data that is uniquely identified by the positions of members in two or more of the dimensions.

9. The method of claim 7, wherein the organization of data comprises at least two dimensions selected from the group consisting of a time dimension, a product dimension, and a geography dimension.

10. A system for allocating data in a hierarchical organization of data, comprising:
    data storage including:
        one or more parents having associated values; and
        a plurality of children having associated values, each child being hierarchically related to one or more of the parents; and
    a server coupled to the organization of data and operable to:
        receive a new value for one or more of the parents;
        receive a current value for one or more of the children;
        receive an identification of the relationship between each parent and its children;
        receive a variation for each child; and
        determine a new value for each child by allocating the new values of the parents to the children based on the parent-child relationships, the current values of the children, and either the sum of the variations of the children or a matrix of the variations of the children.

11. The system of claim 10, wherein the new values of the parents represent demand forecasts to be allocated to the children.

12. The system of claim 10, wherein the variation of each child is calculated using statistical techniques based on the historical variation in the values of the child over a specified time period.

13. The system of claim 10, wherein the server is operable to determine the new value of each child using the equation:

$$\bar{x}'=\bar{x}+\Sigma R^T(R\Sigma R^T)^{-1}(\bar{y}-R\bar{x}),$$

in which $\bar{x}'$ comprises a vector of the new values of the children, $\bar{x}$ comprises a vector of the current values of the children, $\Sigma$ comprises a matrix of the variations of the children, R comprises a matrix identifying the parent-child relationships, $R^T$ comprises the transpose of R, and $\bar{y}$ comprises a vector of the new values of the parents.

14. The system of claim 10, wherein the server is operable to determine the new value of each child is determined using the equation:

$$\bar{x}'_i = \bar{x}_i + \frac{\sigma_{i,i}}{\sum_i \sigma_{i,i}}\left(\bar{y}-\sum_i \bar{x}_i\right),$$

in which $\bar{x}'_i$ comprises the new value of the child i, $\bar{x}_i$ comprises the current value associated with a child i, $\sigma_{i,i}$ comprises the variation of the child i, $\Sigma_i \sigma_{i,i}$ comprises the sum of the variations of the children, $\Sigma_{\bar{x}i}$ comprises the sum of the current values of the children, and $\bar{y}$ comprises the new value of the parent of the child i.

15. The system of claim 10, wherein:
the organization of data comprises one or more dimensions; and
the parents and children are all members of the same dimension within the organization of data.

16. The system of claim 10, wherein:
the organization of data comprises multiple dimensions; and
the parents and children are each associated with multiple dimensions of the organization of data.

17. The system of claim 16, wherein the parents and children each represent a storage location within the organization of data that is uniquely identified by the positions of members in two or more of the dimensions.

18. The system of claim 16, wherein the organization of data comprises at least two dimensions selected from the group consisting of a time dimension, a product dimension, and a geography dimension.

19. Software for allocating data in a hierarchical organization of data, the software embodied in a computer-readable medium and operable to:
determine new values for one or more parents in the organization of data;
determine current values for one or more children in the organization of data, each child being hierarchically related to one or more of the parents;
determine the relationship between each parent and its children;
determine a variation for each child; and
determine a new value for each child by allocating the new values of the parents to the children based on the parent-child relationships, the current values of the children, and either the sum of the variations of the children or a matrix of the variations of the children.

20. The software of claim 19, wherein the new values of the parents represent demand forecasts to be allocated to the children.

21. The software of claim 19, wherein the variation of each child is calculated using statistical techniques based on the historical variation in the values of the child over a specified time period.

22. The software of claim 19, wherein the new value of each child is determined using the equation:

$$\bar{x}'=\bar{x}+\Sigma R^T(R\Sigma R^T)^{-1}(\bar{y}-R\bar{x}),$$

in which $\bar{x}'$ comprises a vector of the new values of the children, $\bar{x}$ comprises a vector of the current values of the children, $\Sigma$ comprises a matrix of the variations of the children, R comprises a matrix identifying the parent-child relationships, $R^T$ comprises the transpose of R, and $\bar{y}$ comprises a vector of the new values of the parents.

23. The software of claim 19, wherein the new value of each child is determined using the equation:

$$\bar{x}'_i = \bar{x}_i + \frac{\sigma_{i,i}}{\sum_i \sigma_{i,i}}\left(\bar{y}-\sum_i \bar{x}_i\right),$$

in which $\bar{x}'_i$ comprises the new value of the child i, $\bar{x}_i$ comprises the current value associated with a child i, $\sigma_{i,i}$ comprises the variation of the child i, $\Sigma_i \sigma_{i,i}$ comprises the sum of the variations of the children, $\Sigma_{\bar{x}i}$ comprises the sum of the current values of the children, and $\bar{y}$ comprises the new value of the parent of the child i.

24. The software of claim 19, wherein:
the organization of data comprises one or more dimensions; and
the parents and children are all members of the same dimension within the organization of data.

25. The software of claim 19, wherein:
the organization of data comprises multiple dimensions; and
the parents and children are each associated with multiple dimensions of the organization of data.

26. The software of claim 25, wherein the parents and children each represent a storage location within the organization of data that is uniquely identified by the positions of members in two or more of the dimensions.

27. The software of claim 25, wherein the organization of data comprises at least two dimensions selected from the group consisting of a time dimension, a product dimension, and a geography dimension.

28. A system for allocating data in a hierarchical organization of data, comprising:
means for determining new values for one or more parents in the organization of data;
means for determining current values for one or more children in the organization of data, each child being hierarchically related to one or more of the parents;
means for determining the relationship between each parent and its children;
means for determining a variation for each child; and
means for determining a new value for each child by allocating the new values of the parents to the children based on the parent-child relationships, the current values of the children, and either the sum of the variations of the children or a matrix of the variations of the children.

29. A computer-implemented method for allocating data in a hierarchical, multi-dimensional organization of data, comprising:
- determining demand forecasts for one or more parents in the organization of data;
- determining current demand values for one or more children in the organization of data, each child being hierarchically related to one or more of the parents;
- determining the relationship between each parent and its children, the parents and children each representing a storage location within the organization of data that is uniquely identified by the positions of members in two or more dimensions of the organization of data;
- determining a variation for each child, the variation calculated using statistical techniques based on the historical variation in the values of the child over a specified time period; and
- determining a new demand value for each child by allocating the demand forecasts for the parents to the children based on the parent-child relationships, the current demand values of the children, and either the sum of the variations of the children or a matrix of the variations of the children.

30. The method of claim 29, wherein the new demand value of each child is determined using the equation:

$$\bar{x}'=\bar{x}+\Sigma R^T(R\Sigma R^T)^{-1}(\bar{y}-R\bar{x}),$$

in which $\bar{x}'$ comprises a vector of the new demand values of the children, $\bar{x}$ comprises a vector of the current demand values of the children, $\Sigma$ comprises a matrix of the variations of the children, R comprises a matrix identifying the parent-child relationships, $R^T$ comprises the transpose of R, and $\bar{y}$ comprises a vector of the demand forecasts of the parents.

31. A system for allocating data in a hierarchical, multi-dimensional organization of data, comprising:
- a hierarchical, multi-dimensional organization of data including:
  - one or more parents having demand associated values; and
  - a plurality of children having associated demand values, each child being hierarchically related to one or more of the parents;
  - the parents and children each representing a storage location within the organization of data that is uniquely identified by the positions of members in two or more dimensions of the organization of data; and
- a server coupled to the organization of data and operable to:
  - receive a forecasted demand value for one or more of the parents;
  - receive a current demand value for one or more of the children;
  - receive an identification of the relationship between each parent and its children;
  - receive a variation for each child, the variation calculated using statistical techniques based on the historical variation in the values of the child; and
  - determine a new demand value for each child by allocating the demand forecasts of the parents to the children based on the parent-child relationships, the current demand values of the children, and either the sum of the variations of the children or a matrix of the variations of the children.

32. The system of claim 31, wherein the new demand value of each child is determined using the equation:

$$\bar{x}'=\bar{x}+\Sigma R^T(R\Sigma R^T)^{-1}(\bar{y}-R\bar{x}),$$

in which $\bar{x}'$ comprises a vector of the new demand values of the children, $\bar{x}$ comprises a vector of the current demand values of the children, $\Sigma$ comprises a matrix of the variations of the children, R comprises a matrix identifying the parent-child relationships, $R^T$ comprises the transpose of R, and $\bar{y}$ comprises a vector of the demand forecasts of the parents.

33. Software for allocating data in a hierarchical organization of data, the software embodied in a computer-readable medium and operable to:
- determine demand forecasts for one or more parents in the organization of data;
- determine current demand values for one or more children in the organization of data, each child being hierarchically related to one or more of the parents;
- determine the relationship between each parent and its children, the parents and children each representing a storage location within the organization of data that is uniquely identified by the positions of members in two or more dimensions of the organization of data;
- determine a variation for each child, the variation calculated using statistical techniques based on the historical variation in the values of the child; and
- determine a new demand value for each child by allocating the demand forecasts for the parents to the children based on the parent-child relationships, the current demand values of the children, and either the sum of the variations of the children or a matrix of the variations of the children.

34. The software of claim 33, wherein the new demand value of each child is determined using the equation:

$$\bar{x}'=\bar{x}+\Sigma R^T(R\Sigma R^T)^{-1}(\bar{y}-R\bar{x}),$$

in which $\bar{x}'$ comprises a vector of the new demand values of the children, $\bar{x}$ comprises a vector of the current demand values of the children, $\Sigma$ comprises a matrix of the variations of the children, R comprises a matrix identifying the parent-child relationships, $R^T$ comprises the transpose of R, and $\bar{y}$ comprises a vector of the demand forecasts of the parents.

* * * * *